US007945656B1

(12) United States Patent
Remaker

(10) Patent No.: US 7,945,656 B1
(45) Date of Patent: May 17, 2011

(54) METHOD FOR DETERMINING ROUND TRIP TIMES FOR DEVICES WITH ICMP ECHO DISABLE

(75) Inventor: Phillip A. Remaker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1344 days.

(21) Appl. No.: 10/968,281

(22) Filed: Oct. 18, 2004

(51) Int. Cl.
*G06F 15/16* (2006.01)
*G06F 15/173* (2006.01)
*H04B 3/20* (2006.01)

(52) U.S. Cl. .................. 709/224; 709/204; 370/289
(58) Field of Classification Search .................. 709/204, 709/224
See application file for complete search history.

(56) References Cited

U.S. PATENT DOCUMENTS

| | | | | |
|---|---|---|---|---|
| 5,708,654 A * | 1/1998 | Arndt et al. | ................ | 370/242 |
| 6,031,528 A * | 2/2000 | Langfahl, Jr. | ................ | 715/734 |
| 6,049,825 A * | 4/2000 | Yamamoto | ................ | 709/221 |
| 6,215,774 B1 * | 4/2001 | Knauerhase et al. | ................ | 370/252 |
| 6,591,306 B1 * | 7/2003 | Redlich | ................ | 709/245 |
| 6,675,206 B1 * | 1/2004 | Britton et al. | ................ | 709/220 |
| 6,757,255 B1 * | 6/2004 | Aoki et al. | ................ | 370/252 |
| 6,915,339 B2 * | 7/2005 | Hartman et al. | ................ | 709/220 |
| 6,934,251 B2 * | 8/2005 | Ono | ................ | 370/229 |
| 6,993,582 B2 * | 1/2006 | Holden et al. | ................ | 709/225 |
| 7,054,930 B1 * | 5/2006 | Cheriton | ................ | 709/226 |
| 7,068,607 B2 * | 6/2006 | Partain et al. | ................ | 370/241 |
| 7,444,428 B1 * | 10/2008 | Kuo et al. | ................ | 709/242 |
| 7,469,418 B1 * | 12/2008 | Wilkinson et al. | ................ | 726/22 |
| 2002/0184533 A1 * | 12/2002 | Fox | ................ | 713/201 |
| 2003/0005125 A1 * | 1/2003 | Berthaud et al. | ................ | 709/226 |
| 2003/0204611 A1 * | 10/2003 | McCosh et al. | ................ | 709/230 |
| 2004/0054805 A1 * | 3/2004 | Sen et al. | ................ | 709/240 |
| 2005/0021737 A1 * | 1/2005 | Ellison et al. | ................ | 709/224 |
| 2005/0021770 A1 * | 1/2005 | Helm et al. | ................ | 709/228 |
| 2005/0286430 A1 * | 12/2005 | Koga et al. | ................ | 370/241 |
| 2006/0087993 A1 * | 4/2006 | Sengupta et al. | ................ | 370/310 |
| 2008/0114887 A1 * | 5/2008 | Bryers et al. | ................ | 709/230 |

* cited by examiner

*Primary Examiner* — Kenny S Lin
*Assistant Examiner* — Guang Li
(74) *Attorney, Agent, or Firm* — Cesari and McKenna, LLP

(57) ABSTRACT

A method and apparatus for determining reachability of a device connected to a computer network by receiving from a requesting device at least one ICMP echo request, the at least one ICMP echo request having a destination address associated with a non-echoing device; in response to the received ICMP echo request, sending a ping to the non-echoing device; receiving from the non-echoing device a reply to the sent ping; issuing from a routing device a subsequent at least one ICMP echo request to the non-echoing device and determining that no response is received to the issued at least one ICMP echo request; receiving at least one subsequent ICMP echo request from a requesting device, the at least one subsequent having a destination address associated with the non-echoing device; and in response to the received reply to the additional ping, sending a proxy ICMP echo reply to the requesting device.

31 Claims, 2 Drawing Sheets

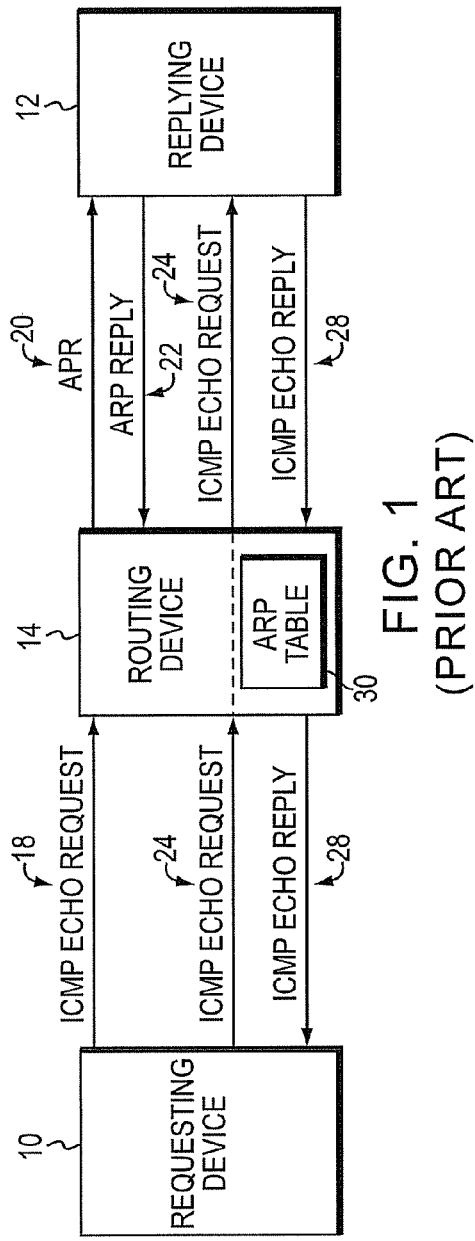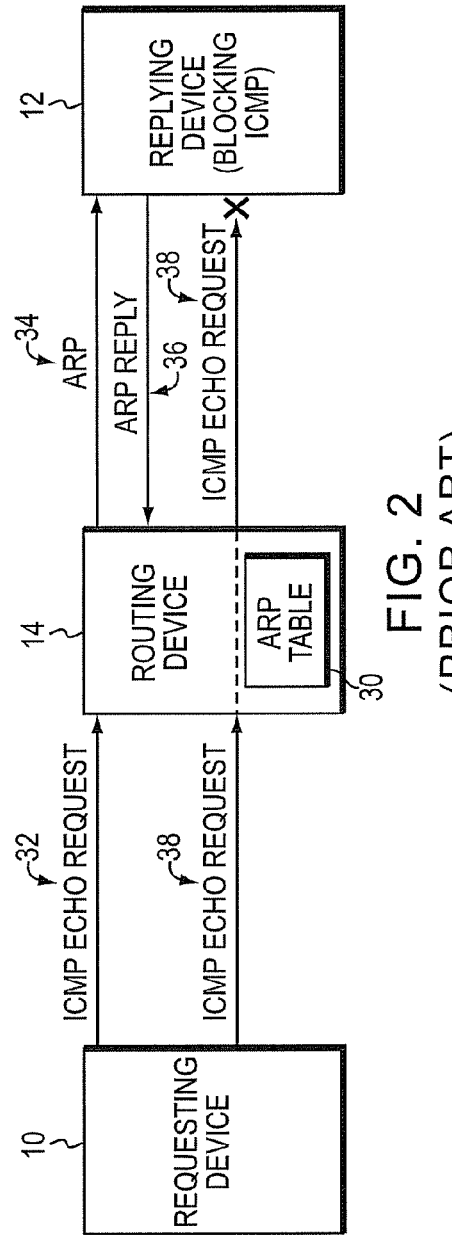

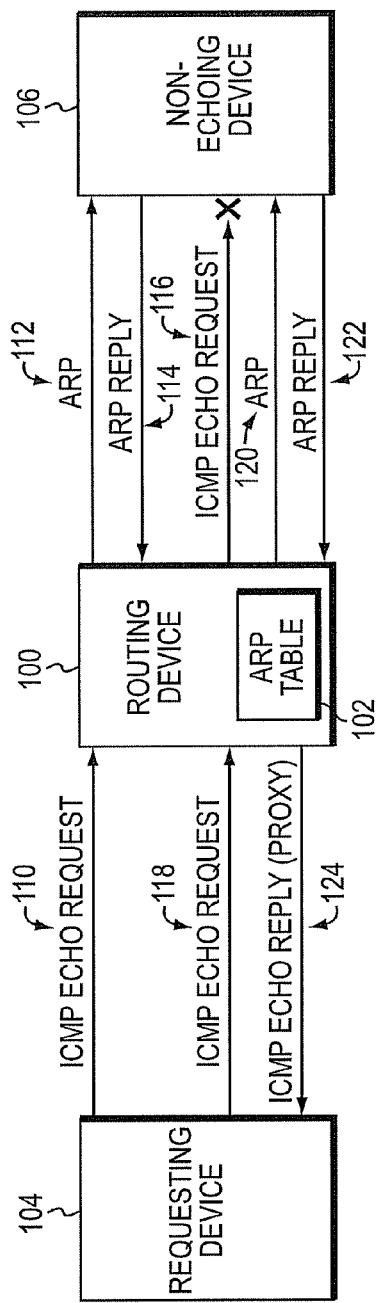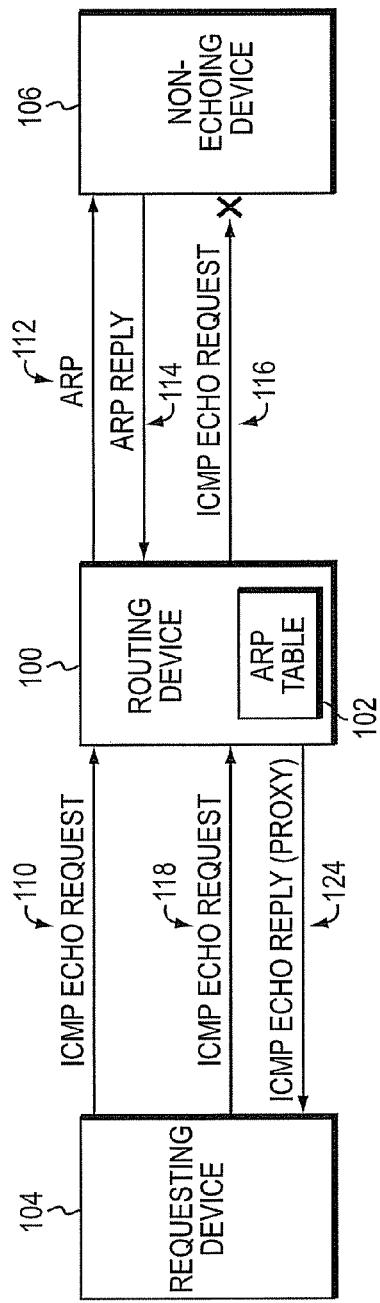

METHOD FOR DETERMINING ROUND TRIP TIMES FOR DEVICES WITH ICMP ECHO DISABLE

FIELD OF THE INVENTION

The present invention relates broadly to computer networks. Specifically, the present invention relates to routers employed in computer networks. More specifically, the present invention relates to detecting devices connected to a network that do not respond to ICMP echo requests.

BACKGROUND

As a requirement imposed by the Internet Engineering Task Force Request For Comments (RFC) 793, an Internet Control Message Protocol (ICMP) echo server executes on all IP Version 4 (hereafter referred to simply as "IP") end system computers and all IP-speaking intermediate systems (e.g., routers). Any system on an IP network that can form ICMP echo requests may send an echo request to any other node on that IP network and expect an echo reply. The ICMP echo protocol is used to diagnose problems with delivery of IP datagrams within an IP network. It can be used to show when a particular end system is not responding, when an IP network is not reachable, when a node is overloaded, when an error occurs in the IP header information, etc. It can also be used to determine the round trip time of a datagram between devices. The protocol is frequently used by Internet managers to verify correct operations of end systems and to check that routers are correctly routing packets to specified destination addresses.

A "ping" program contains a client interface to ICMP echo service. A ping may use the ICMP echo service to verify that a device is online, or that an end-to-end Internet path is operational. The ping program also collects performance statistics such as the measured round trip time and the number of times the remote server fails to reply. Each time an ICMP echo reply message is received, the ping program displays a single line of text or some other symbol representing a success or failure. The text printed by ping typically shows the received sequence number of a packet, and the measured round trip time (in milliseconds). Each ICMP echo message contains a sequence number (starting at 0) that is incremented after each transmission.

Address Resolution Protocol (ARP) is the means by which an IP address is translated into a physical Media Access Control (MAC) address on a shared network access medium such as IEEE 802.3 Ethernet. All IP addresses must be mapped to a "MAC address" in order to complete communication to a device on a shared network medium. Before a packet is delivered to a local host on a shared medium, the sending device looks up the IP address in its ARP cache, which is a table that contains mappings of the IP address to the MAC address. If it finds the MAC address associated with the IP address, the sending device constructs and sends a packet with a media (e.g. Ethernet) header containing the correct destination MAC address and an appropriate source MAC address. In the event that there is no appropriate IP to MAC address mapping in the table, the packet will be discarded and an ARP Request will be broadcast on the medium, seeking to find the MAC address associated with the desired IP address. If an ARP Reply is received, the IP address and MAC address are entered into the table, and all subsequent data packets to the IP address are delivered to the appropriate MAC address. Typically, network hosts and routers maintain their own ARP tables. All hosts in a network medium broadcast domain passively listen to broadcast ARP packets, and issue unicast replies to broadcast requests. They also record information heard in these broadcast packets as well as replies to their local ARP tables. A host actively attempts to discover a particular address using ARP only when it looks for a logical IP address it does not have in its ARP table. All devices on a network reply to an ARP request for an IP address for which they accept packets.

As illustrated in FIG. 1, requesting device 10 and replying device 12 communicate through a router device 14. Requesting device 10 sends an ICMP echo request 18 to router 14, which in turn attempts to forward that ICMP echo request (not illustrated) to replying device 12. If router device 14 does not have an entry in ARP table 30 for replying device 12 in its ARP table 30, router device 14 discards the ICMP echo request 18. After discarding ICMP echo request 18, router 14 generates ARP request broadcast 20, which will be heard by device 12. Device 12 responds to router 14 with ARP reply 22, which will be entered in to ARP table 30. When a subsequent ICMP echo request 24 is sent from device 12 through routing device 14, router device 14 can use the information in ARP table 30 to forward ICMP echo request 24 to replying device 12. In the event that replying device 12 replies to ICMP echo requests, ICMP echo request 24 causes ICMP echo reply 28 to be generated and sent to routing device 14, which can forward it back to requesting device 10.

The problem occurs when replying device 12 stops replying to ICMP echo requests, as may be done for security purposes. As shown in FIG. 2, ICMP echo request 32 triggers ARP 34 and corresponding ARP reply 36. Replying device 12 may block subsequent ICMP echo request 38 forwarded by routing device 14. In this instance, no ICMP echo reply is generated or sent back to requesting device 10 in response to ICMP echo request 38.

With the advent of Windows XP Service Pack 2 and other personal firewalls used on personal computers, it is possible to easily configure a system not to respond to ICMP echo requests, which makes remote diagnostics difficult and sometimes impossible. Even though such a configuration is a violation of RFC 793, it is becoming commonplace among misinformed system administrators. Since no communication can occur without the use of ARP, ARP replies are still reliably received no matter what the setting of a personal computer firewall. There is still a heartfelt need for a method by which a router, firewall, or any proxy device can answer ICMP echo requests in proxy for devices residing behind a firewall that refuse to answer ICMP echo requests.

SUMMARY

The present invention solves the problems described above by providing a routing device that uses the status of the ARP protocol in order to respond to a request, such as an ICMP echo request, in proxy for a device that has disabled ICMP echo replies.

BRIEF DESCRIPTION OF THE DRAWINGS

FIG. 1 illustrates communication between a requesting device and a replying device in which the replying device responds to ICMP echo requests.

FIG. 2 illustrates communication between a requesting device and a replying device in which the replying device does not respond to ICMP echo requests.

FIG. 3 illustrates communication between a requesting device and a replying device in which a routing device answers ICMP echo requests in proxy for networked devices;

FIG. 4 illustrates a routing device that answers ICMP echo requests in proxy for networked devices and caches ARP round trip time.

DETAILED DESCRIPTION

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure relates to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine-readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Directing attention to FIG. 3, the present invention solves the problem described above by providing a routing device that answers ICMP echo requests in proxy for firewalled-off devices or other devices that do not respond to ICMP echo requests. Routing device 100 maintains ARP table 102 and sends an ICMP echo request to every device listed in ARP table 102. This sending of the ICMP echo request can be performed periodically, or whenever the ARP table is updated. While FIG. 3 illustrates a single ICMP echo request originating at routing device 100, any configurable number of ICMP echo requests may be sent to a single device. Routing device 100 keeps track of devices that do not respond to the sent ICMP echo requests. In an embodiment, routing device 100 maintains a table of these non-echoing devices. When routing device 100 detects ICMP echo request 110 from networked device 104 for non-echoing device 106, routing device 100 begins a proxy response procedure by issuing ARP (ping) 112 to non-echoing device 106 and awaiting a reply. Once ARP reply 114 is received from non-echoing device 106, for example, by way of an ARP reply, routing device 100 sends ICMP echo request 116 to determine that non-echoing device 106 is blocking ICMP requests. Once this determination is made, when requesting device 104 sends ICMP echo request 118, routing device 100 sends non-echoing device 106 ARP 120, and receives from it ARP reply 122. Routing device 100 then sends ICMP echo reply 124 to requesting device 104 in proxy for non-echoing device 106. In an embodiment, the ICMP echo reply contains a flag that indicates that the ICMP echo reply is a proxy reply.

FIG. 4 illustrates an alternative embodiment of the present invention that avoids sending ARP 120 and ARP reply 122 to non-echoing device 106. Sending and receiving ARP 112 and ARP Reply 114 between routing device 100 and non-echoing device 106 allows routing device 100 to measure round trip time for time between routing device 100 sending an ARP and receiving a reply. This round trip time can be stored in routing device 100's ARP table 102. In one embodiment, the round trip time is measured and stored a priori; in another embodiment the round trip time is calculated in real time as requesting device 104 sends a request through routing device 100. Routing device 100 can delay responding to requesting device 104 with proxy ICMP echo reply 124 for the amount of time equivalent to the stored round trip time, such that requesting device 104 will be able to ascertain total round trip time of a successful ping of non-echoing device 106. This embodiment prevents additional delay being introduced to total round trip time by a routing device spawning the ARP to be sent to the destination device, receiving the reply, and sending an ICMP echo reply in response to the received reply.

While FIGS. 1-4 illustrate for simplicity an ICMP echo request as a single communication sent from either a networked device or a routing device, it is to be understood that in current practice several ICMP echo requests and ARP requests are often sent in rapid succession, such as once every two seconds during a ten second interval, to rule out network congestion as a reason for non-reply. In FIG. 4 for example, a plurality of ICMP echo requests originate at requesting device 104, with routing device 100 generating a plurality of ICMP echo requests to non-echoing device 106. While prior art routing devices used an ARP table that simply associated IP addresses with hardware addresses, in an embodiment of the present invention, routing device 100 maintains an ARP table modified to associate IP address with hardware address and ICMP capability, as shown in table 1. ICMP capability can be indicated in the ARP table on routing device 100 as affirmative or negative, but also a checking state can be indicated, as is the case during the sending of multiple ICMP echo requests from routing device 100 to non-echoing device 106. Routing device 100's ARP table 102 can also include an optional field that indicates round trip (RT) time per device for sending an ARP request and receiving an ARP reply from non-echoing device 106, as well as round trip time for sending an ICMP echo request and receiving an ICMP echo reply.

TABLE 1

| IP address | hardware address | ICMP? | RT Time |
|---|---|---|---|
| x.x.x.x | AB:CD:AB:CD:AB:CD | yes | xxx |
| x.x.x.x | AF:CD:AF:BC:12:34 | no | xxx |
| x.x.x.x | AD:CB:AD:CB:AD:CB | checking | xxx |

An embodiment of the present invention also solves the problem where it takes longer than the duration of the multiple requests sent by requesting device 104 to determine that a proxy ping should be sent to non-echoing device 106, a situation in which the non-requesting device assumes its target device is not reachable through routing device 100. In this embodiment, routing device 100 listens for all ARP requests on the local broadcast network medium and sends ICMP echo requests to every IP address from which it hears a broadcasted ARP request. In this manner, routing device 100 quickly builds its ARP table and subsequently the ICMP capability state of active devices on the network. In this embodiment, routing device 100 may no longer need to send a proxy ICMP Echo Request upon receiving one from requesting device 104, and can merely reply to requesting device 104 directly with a proxy ICMP echo reply after performing a table lookup of its ARP table, or by using any of the other proxy reply mechanisms described previously.

It is to be understood that the methods described above can be embodied in software stored in memory and executed as needed, or in hardware specifically configured to achieve the function described herein.

In a basic embodiment of routing device 100, there is included a communication connection, processor, memory, and routing table. In a more detailed embodiment, routing device 100 is part of a gateway routing device and includes combinations of processors, memories, termination cards, and universal port DSP cards, among other components known to those skilled in the art and typically found in gateway routing systems. For example, routing device 100 may include Ethernet cards, fast Ethernet cards, wireless access points, etc., that provides an STM-1 interface for high-density PSTN connectivity. In an embodiment, this card provides a maximum of 1890 (1953 in SS7/IMT configuration) DS0 channels (63 E1s) via a single STM-1 connection. The SDH/STM-1 trunk card is a high-density multiplex/demultiplex card that takes in an STM-1 (Synchronous Digital Hierarchy [SDH]) pipe, used to transport up to 1890 (1953 in SS7/IMT configuration) DS0 channels. Digital calls are terminated onboard the SDH/STM-1 trunk card on HDLC controllers. There are 512 HDLC controllers and each HDLC controller can be used for either a D-channel or one digital call. The SDH/STM-1 trunk card can terminate a maximum of 512 digital calls, less the number of D-channels. For example, with 63 D-channels allocated, 449 digital calls can be terminated. Additional digital calls and analog modem-originated calls are passed over the TDM bus to an available modem resource pool. The physical layer interface for the SDH/STM-1 trunk card is synchronous transport module (STM). Each SDH/STM-1 trunk card has two 155-Mbps STM physical layer interfaces which allow 1+1 fiber protection. Each SDH/STM-1 trunk card has two LC small form-factor type fiber receptacles to allow connection to single-mode optical fiber. The SDH/STM-1 trunk card supports SDH MIB RFC 1595, DS1 MIB RFC 1406, and provides support for SNMPv1 agent (RFC 1155-1157), and Management Information Base (MIB) II (RFC 1213). The SDH/STM-1 trunk card supports online insertion and removal (OIR), a feature that allows users to remove and replace trunk cards in active unit 10 and standby unit 12 while the system is operating, without disrupting other cards and their associated calls. In an embodiment, a test port is provided to test drop-and-insert testing on any DS1/E1 from an external testing device including monitoring of both transmit and receive directions on any E1s with a built-in DS1/E1 interface.

Routing device 100 may also include a route switch controller. In various embodiments, the route switch controller includes integrated IP switching and routing functions, high-performance programmable Layers 3 and 4 IP packet switch with 5-Gbps application-specific integrated circuit (ASIC)-based switch fabric, fully distributed Cisco Express Forwarding for optimal packet forwarding, multiple processors, capability for building integrated timing supply (BITS) clock input, and dual redundant Gigabit Ethernet egress fiber links.

A 324-port DSP card can also be included in routing device 100. These DSP ports are fully consistent with the any-to-any, fully pooled model for DSP resources in routing device 100.

While a method and apparatus for determining reachability and round trip time for communicating with devices blocking ICMP echo requests has been illustrated and described in detail, it is to be understood that many modifications can be made to various embodiments of the present invention without departing from the spirit thereof.

What is claimed is:

1. A method for determining reachability of a device connected to a computer network, the method comprising:
    receiving at a routing device at least one Internet Control Message Protocol (ICMP) echo request from a requesting device, the at least one ICMP echo request having a destination address associated with a non-echoing device;
    in response to the received ICMP echo request, sending an address resolution request to the non-echoing device;
    receiving from the non-echoing device a reply to the sent address resolution request;
    issuing from the routing device at least one ICMP echo request to the non-echoing device and determining that no response is received to the issued at least one ICMP echo request;
    receiving at least one subsequent ICMP echo request at the routing device from a requesting device, the at least one subsequent ICMP echo request having a destination address associated with the non-echoing device;
    in response to the received at least one subsequent ICMP echo request, sending an additional address resolution request to the non-echoing device;
    receiving from the non-echoing device a reply to the additional address resolution request; and
    in response to the received reply from the non-echoing device to the additional address resolution request, and absent receipt of any ICMP echo reply from the non-echoing device, sending a proxy ICMP echo reply from the routing device to the requesting device.

2. The method of claim 1, further comprising maintaining a table that indicates devices are non-echoing devices.

3. The method of claim 2, wherein the table is an address resolution table on the routing device that associates Internet Protocol (IP) addresses with hardware addresses and ICMP capability.

4. The method of claim 1, wherein the proxy ICMP echo reply indicates round trip time to communicate with the non-echoing device.

5. The method of claim 4, wherein the round trip time to communicate with the non-echoing device is based, at least in part, on a time between sending a particular address resolution request to the non-echoing device and receiving a reply to the sent particular address resolution request.

6. The method of claim 5, wherein the time between sending the particular address resolution request to the non-echoing device and receiving the reply to the sent particular address resolution request is stored on the routing device.

7. The method of claim 1, wherein the address resolution request is an Address Resolution Protocol (ARP) request.

8. The method of claim 1, wherein the non-echoing device is a device configured to not respond to ICMP echo requests.

9. The method of claim 1, wherein the sending comprises:
    delaying before sending the proxy ICMP echo reply for a time equal to the time between sending a particular address resolution request to the non-echoing device and receiving a reply to the sent particular address resolution request.

10. A method for determining reachability of a device connected to a computer network, the method comprising:
    receiving at a routing device at least one Internet Control Message Protocol (ICMP) echo request from a requesting device, the at least one ICMP echo request having a destination address associated with a non-echoing device;
    in response to the received ICMP echo request, sending an address resolution request to the non-echoing device;

receiving from the non-echoing device a reply to the sent address resolution request;

issuing from a routing device at least one ICMP echo request to the non-echoing device and determining that no response is received to the issued at least one ICMP echo request;

receiving at least one subsequent ICMP echo request at the routing device is from a requesting device, the at least one subsequent ICMP echo request having a destination address associated with the non-echoing device; and in response to receiving the at least one subsequent ICMP echo request at the routing device, and absent receipt of any ICMP echo reply from the non-echoing device, sending a proxy ICMP echo reply from the routing device to the requesting device.

11. The method of claim 10, further comprising maintaining a table that indicates devices are non-echoing devices.

12. The method of claim 11, wherein the table is an address resolution table on the routing device that associates Internet Protocol (IP) addresses with hardware addresses and ICMP capability.

13. The method of claim 10, wherein the proxy ICMP echo reply indicates round trip time to communicate with the non-echoing device.

14. The method of claim 13, wherein the round trip time to communicate with the non-echoing device is based, at least in part, on a time between sending a particular address resolution request to the non-echoing device and receiving a reply to the sent particular address resolution request.

15. The method of claim 14, wherein the time between sending the particular address resolution request to the non-echoing device and receiving the reply to the sent particular address resolution request is stored on the routing device.

16. The method of claim 10, wherein the non-echoing device is a device configured to not respond to ICMP echo requests.

17. The method of claim 10, wherein the sending comprises:

delaying before sending the proxy ICMP echo reply for a time equal to the time between sending a particular address resolution request to the non-echoing device and receiving a reply to the sent particular address resolution request.

18. The method of claim 10, wherein the address resolution request is an Address Resolution Protocol (ARP) request.

19. A routing device, comprising:

a processor; and a memory configured to store instructions, which when executed by the processor, enable the routing device to:

receive from a requesting device at least one Internet Control Message Protocol (ICMP) echo request, the at least one ICMP echo request having a destination address associated with a non-echoing device;

in response to the received ICMP echo request, send an address resolution request to the non-echoing device;

receive from the non-echoing device a reply to the sent address resolution request;

issue at least one ICMP echo request to the non-echoing device and determine that no response is received to the issued at least one ICMP echo request;

receive at least one subsequent ICMP echo request from a requesting device, the at least one subsequent ICMP echo request having a destination address associated with the non-echoing device; and in response to the receipt of the at least one subsequent ICMP echo request, and absent receipt of any ICMP echo reply from the non-echoing device, send a proxy ICMP echo reply to the requesting device.

20. The routing device of claim 19, wherein the address resolution request is an Address Resolution Protocol (ARP) request.

21. The routing device of claim 19, wherein the non-echoing device is a device configured to not respond to ICMP echo requests.

22. The routing device of claim 19, wherein the memory is further configured to store an address resolution table that associates Internet Protocol (IP) addresses with hardware addresses and ICMP capability.

23. The routing device of claim 22, wherein the address resolution table further stores a round trip time that indicates a time between sending a particular address resolution request to the non-echoing device and receiving the reply to the sent particular address resolution request.

24. A method comprising:

receiving at a routing device at least one Internet Control Message Protocol (ICMP) echo request from a requesting device, the at least one ICMP echo request having a destination address associated with a non-echoing device accessible through the routing device;

sending an address resolution request from the routing device to the non-echoing device;

receiving at the routing device a reply from the non-echoing device to the address resolution request sent from the routing device;

in response to the received reply from the non-echoing device to the address resolution request, and absent receiving any ICMP echo reply from the non-echoing device, sending a proxy ICMP echo reply from the routing device, on behalf of the non-echoing device, to the requesting device.

25. The method of claim 24, wherein the address resolution request is an Address Resolution Protocol (ARP) request.

26. The method of claim 24, wherein the non-echoing device is a device configured to not respond to ICMP echo requests.

27. The method of claim 24, wherein the sending comprises:

delaying before sending the proxy ICMP echo reply, on behalf of the non-echoing device, for a time equal to a time between sending a particular address resolution request from the routing device to the non-echoing device and receiving a reply at the routing device to the sent particular address resolution request.

28. A routing device comprising:

means for receiving at least one Internet Control Message Protocol (ICMP) echo request from a requesting device, the at least one ICMP echo request having a destination address associated with a non-echoing device accessible through the routing device;

means for sending an address resolution request from the routing device to the non-echoing device;

means for receiving a reply from the non-echoing device to the address resolution request sent from the routing device;

means for sending a proxy ICMP echo reply, on behalf of the non-echoing device, to the requesting device, in response to the received reply to the address resolution request sent from the routing device, and absent receipt of any ICMP echo reply from the non-echoing device.

29. The routing device of claim 28, wherein the address resolution request is an Address Resolution Protocol (ARP) request.

30. The routing device of claim 28, wherein the non-echoing device is a device configured to not respond to ICMP echo requests.

31. The routing device of claim 28, further comprising:
means for delaying before sending the proxy ICMP echo reply, on behalf of the non-echoing device, for a time equal to a time between sending a particular address resolution request from the routing device to the non-echoing device and receiving a reply at the routing device to the sent particular address resolution request.

* * * * *